United States Patent [19]

Knueven et al.

[11] Patent Number: 6,132,792
[45] Date of Patent: *Oct. 17, 2000

[54] ALKALI METAL BISULFATES AS ACIDULANTS IN LEAVENED BAKED GOODS

[75] Inventors: Carl Joseph Knueven, Bowling Green, Ohio; Richard Alan Williams, Plymouth, Minn.

[73] Assignee: Jones-Hamilton Co., Newark, Calif.

[ * ] Notice: This patent is subject to a terminal disclaimer.

[21] Appl. No.: 09/386,241

[22] Filed: Aug. 31, 1999

Related U.S. Application Data

[63] Continuation-in-part of application No. 09/131,522, Aug. 10, 1998, Pat. No. 5,958,491.

[51] Int. Cl.[7] .......................... A21D 10/00; A21D 13/00; A21D 2/00
[52] U.S. Cl. .......................... 426/549; 426/321; 426/496; 426/562
[58] Field of Search ..................... 426/321, 534, 426/654, 590, 519, 549, 562, 561, 496

[56] References Cited

U.S. PATENT DOCUMENTS

| | | | |
|---|---|---|---|
| 4,352,826 | 10/1982 | Pearline et al. | 426/39 |
| 4,374,152 | 2/1983 | Loter | 426/39 |
| 4,959,229 | 9/1990 | Reddy et al. | 426/39 |
| 5,198,254 | 3/1993 | Nisperos-Carriedo et al. | 426/102 |
| 5,310,549 | 5/1994 | Bull | 424/78.08 |
| 5,773,063 | 6/1998 | Knueven | 426/335 |

OTHER PUBLICATIONS

Hawley's Condensed Chemical Dictionary, 12th Ed., pp. 16, 17, 1050 (1993).
Food Engineering, pp. 83–86 (1986).
"Food Acidulants", Pfizer Technical Information (1981).

*Primary Examiner*—Nina Bhat
*Attorney, Agent, or Firm*—MacMillan, Sobanski & Todd, LLC

[57] ABSTRACT

The invention relates to a leavened baked good including alkali metal bisulfate and a substance capable of releasing gas upon reaction with the alkali metal bisulfate to leaven the baked good.

20 Claims, No Drawings

ALKALI METAL BISULFATES AS ACIDULANTS IN LEAVENED BAKED GOODS

CROSS-REFERENCE TO RELATED APPLICATION

This application is a continuation-in-part of U.S. Ser. No. 09/131,522, filed Aug. 10, 1998 U.S. Pat. No. 5,958,491.

BACKGROUND OF THE INVENTION

This invention relates in general to acidulants for use in foods, and in particular to the use of alkali metal bisulfates as acidulants in leavened baked goods.

Acidulants are acids which are added to foods to provide a variety of functions. The major functions are: to enhance the flavor of the foods by imparting a tart, sour taste; to lower pH, thus preventing the growth of bacteria which cause spoilage and food poisoning; and to chelate metal ions such as iron and copper which catalyze rancidity reactions in fats. Commonly used acidulants are citric, acetic, fumaric, ascorbic, propionic, lactic, adipic, malic, sorbic, phosphoric and tartaric acids. Most of the acidulants are organic acids.

The known acidulants are not always totally satisfactory. For example, the organic acids are relatively weak, so that a relatively large amount of the acid must be used in the food to achieve the desired effect. This can undesirably increase the cost of the food, and can present other disadvantages. Some of the acidulants, such as citric acid and malic acid, are relatively expensive to begin with. Some acidulants are not very soluble in foods. Other acidulants are difficult to handle during food processing because of their corrosive nature. Accordingly, it would be desirable to provide new acidulants for use in leavened baked goods as attractive alternatives to the known acidulants.

SUMMARY OF THE INVENTION

This invention relates to a leavened baked good including an alkali metal bisulfate and a substance capable of releasing gas upon reaction with the alkali metal bisulfate to leaven the baked good. In a preferred embodiment, the alkali metal bisulfate is sodium bisulfate, and the substance capable of releasing gas is a baking carbonate. Preferably, the alkali metal bisulfate is included in an amount within a range of from about 0.1% to about 1.0% by weight of the baked good. Also preferably, the alkali metal bisulfate is finely ground so that the particles have an average diameter within a range of from about 0.03 millimeter to about 0.2 millimeter.

It was not previously thought to use alkali metal bisulfates as acidulants in the leavening systems of baked goods. Previously, alkali metal bisulfates were used mainly in industrial chemicals and cleaners, in metal finishing, and in other uses much different from acidulants in foods. Alkali metal bisulfates do not come to mind when a person thinks of acids for addition to foods. They do not have an "acid" handle on them. They are not considered in the same class of products as the known acidulants. The majority of the known acidulants are organic acids, which are common ingredients in foods, and which are often naturally occurring in foods. Alkali metal bisulfates are not organic acids. Prior to this invention, sodium bisulfate had not been approved by the Food and Drug Administration for use in foods. Further, it was not evident that alkali metal bisulfates would be desirable for use as acidulants in foods such as leavened baked goods.

Various objects and advantages of this invention will become apparent to those skilled in the art from the following detailed description of the preferred embodiment.

DETAILED DESCRIPTION OF THE PREFERRED EMBODIMENT

The alkali metal bisulfates for use as acidulants in leavened baked goods according to this invention include sodium bisulfate, potassium bisulfate, and mixtures thereof. The sodium bisulfate is a sodium salt of sulfuric acid generally expressed as $NaHSO_4$ (CAS Reg. No. 7681-38-1). A preferred sodium bisulfate product is manufactured by Jones-Hamilton Co., 30354 Tracy Road, Walbridge, Ohio 43465. The Jones-Hamilton sodium bisulfate is a dry product comprising crystalline solid particles. The particles have a spherical shape with an average diameter within a range from about 0.03 millimeter to about 1 millimeter. The product is hygroscopic and is readily soluble in water. The product can be safely handled without harm to the skin. It is significantly less expensive than many of the known acidulants.

The Jones-Hamilton sodium bisulfate is also preferred because it is a high quality product with low impurity levels. The product includes sodium bisulfate in an amount within a range of from about 91.5% to about 95.5% by weight (typically about 93%), and sodium sulfate in an amount within a range of from about 4.5% to about 8.5% by weight (typically about 7%). (In determining the percentage of alkali metal bisulfate in baked goods according to the invention, only the actual amount of alkali metal bisulfate in the baked good is included in the calculation, while other materials such as alkali metal sulfate are ignored in the calculation.)

The Jones-Hamilton product is also low in impurities, containing less than 0.003% heavy metals (typically less than 0.0004%), less than about 0.05% water insoluble substances (typically about 0.001%), and less than 0.003% selenium (all measured by weight percent). The product has a moisture content (measured by loss on drying) of less than 0.8% (typically about 0.2%).

The low impurities and low moisture content of the Jones-Hamilton sodium bisulfate allow it to meet Food Chemicals Codex specifications. The Food and Drug Administration recently issued a letter in which it did not question the conclusion that Jones-Hamilton's sodium bisulfate is generally recognized as safe (GRAS) as an acidulant in foods. It is believed that previous commercial sodium bisulfate products had too many impurities to meet the Food Chemicals Codex specifications. Of course, the present invention is not limited to the use of the Jones-Hamilton sodium bisulfate, but rather it includes any alkali metal bisulfate product suitable for use in leavened baked goods.

The potassium bisulfate is a potassium salt of sulfuric acid generally expressed as $KHSO_4$ (CAS Reg. No. 7646-93-7).

Advantageously, the use of alkali metal bisulfates as acidulants in baked goods provides a happy medium between the use of organic acids typically used as acidulants, and the use of common inorganic acids such as sulfuric acid and hydrochloric acid. Typical organic acids are weakly acidic, having a $pK_a$ of about 3–4. Sodium bisulfate is more strongly acidic than most organic acids, having a $pK_a$ of 1.9. As a result, significantly less sodium bisulfate is needed than organic acid to provide a desired leavening effect. However, sodium bisulfate is weakly acidic compared to the common inorganic acids, such as sulfuric acid and hydrochloric acid. The common inorganic acids, having a $pK_a$ of less than 1, will lower pH very quickly and too much. This can cause harmful effects on foods.

The alkali metal bisulfate is included in the baked good in an amount effective to act as an acidulant in the leavening system of the baked good. Usually, the alkali metal bisulfate is included in an amount within a range of from about 0.01% to about 2.0% by weight of the baked good. The baked good ingredients should be thoroughly mixed so that the alkali metal bisulfate is uniformly distributed throughout the baked good.

The optimum particle size of the alkali metal bisulfate will vary depending on the type of baked good. Usually, the particles will have an average diameter within a range of from about 0.03 millimeter to about 1 millimeter. If desired, the alkali metal bisulfate can be ground or otherwise processed to reduce the particle size before incorporation into the baked good, by methods well known to those skilled in the art.

The alkali metal bisulfate is acidic only in aqueous solution. Consequently, for the alkali metal bisulfate to be effective as an acidulant, the baked good ingredients include sufficient moisture to dissolve the alkali metal bisulfate during preparation of the baked good. The alkali metal bisulfate is hygroscopic and will readily absorb moisture from the other baked good ingredients.

As is well known to those skilled in the art, the leavening of a baked good is accomplished by liberation of carbon dioxide within the dough or batter during its preparation and in the early stages of baking. The carbon dioxide serves the purpose of lightening the baked good, giving it a finer, smoother texture and increasing its volume. Of course, other gases besides carbon dioxide could also be used for leavening the baked good, providing the gases are edible.

The leavening system includes alkali metal bisulfate and a substance (usually an alkaline substance) capable of releasing carbon dioxide or other gas upon reaction with the alkali metal bisulfate. Usually, the alkaline substance is a baking bicarbonate, preferably an alkali metal bicarbonate, i.e., sodium bicarbonate, potassium bicarbonate, ammonium bicarbonate, calcium carbonate, magnesium carbonate, lithium bicarbonate, or a mixture thereof.

The alkali metal bisulfate can be used as an acidulant in the leavening system of a variety of baked goods including, for example, cakes, quick breads, muffins, biscuits, pancakes, waffles, and the like, which require the generation of carbon dioxide in order to "rise" when they are baked. Preferably, the alkali metal bisulfate is included in an amount within a range of from about 0.1% to about 1.0% by weight of the baked good.

As will be described below, it has been discovered that the particle size of the alkali metal bisulfate is important for providing an optimum product in some baked goods. Preferably, the alkali metal bisulfate is finely ground so that the particles have an average diameter within a range of from about 0.03 millimeter to about 0.2 millimeter.

Basic Yellow Cakes

Basic yellow cakes were prepared using sodium bisulfate as the acidulant in the leavening system. Specifically, the leavening system included sodium bisulfate and sodium bicarbonate. Each of the cakes using sodium bisulfate as the acidulant was prepared as follows:

| Ingredients | Weight |
| --- | --- |
| cake flour | 293 grams |
| sugar (granulated) | 346 grams |

-continued

| Ingredients | Weight |
| --- | --- |
| sodium bisulfate | 7 grams |
| sodium bicarbonate | 5 grams |
| salt | 6 grams |
| milk (skim) | 305 grams |
| shortening (Crisco) | 75.5 grams |
| water | 55.9 grams |
| eggs (mixed) | 156 grams |
| vanilla extract | 3 grams |

The flour, sugar, sodium bisulfate, sodium bicarbonate and salt were combined in a mixing bowl. Next, 188 grams of the milk and the shortening were added to the mixing bowl. These ingredients were mixed in a Hobart Kitchen Aid mixer at #2 speed for 2 minutes, using a paddle to aid the mixing. Then, the eggs, 117 grams of the milk, and the vanilla extract were added to the mixing bowl. The ingredients were mixed at #3 speed for 2 more minutes to form a batter. The batter (1145 grams) was poured into a greased and floured (13×9×2-inch) pan and baked in a preheated oven at 350° F. for 35 minutes.

For purposes of comparison, control cakes were prepared using baking powder as the leavening system. The baking powder contained sodium bicarbonate, tartaric acid and cornstarch. Each of the control cakes was prepared as follows:

| Ingredients | Weight |
| --- | --- |
| cake flour | 293 grams |
| sugar (granulated) | 346 grams |
| baking powder | 12 grams |
| salt | 6 grams |
| milk (skim) | 305 grams |
| shortening (Crisco) | 151 grams |
| eggs (mixed) | 156 grams |
| milk (skim) | 117 grams |
| vanilla extract | 3 grams |

The flour, sugar, baking powder and salt were combined in a mixing bowl. Next, 188 grams of the milk and the shortening were added to the mixing bowl. These ingredients were mixed in a Hobart Kitchen Aid mixer at #2 speed for 2 minutes, using a paddle to aid the mixing. Then, the eggs, 117 grams of the milk, and the vanilla extract were added to the mixing bowl. The ingredients were mixed at #3 speed for 2 more minutes to form a batter. The batter (1145 grams) was poured into a greased and floured (13×9×2-inch) pan and baked in a preheated oven at 350° F. for 35 minutes.

The cakes using sodium bisulfate as the acidulant, and the control cakes, were tasted for flavor, and were observed for height, texture, and crumb structure. Sensory testing concluded that the flavor was very good in both types of cake. The cakes using sodium bisulfate as the acidulant were found to have a lighter, cleaner and slightly citrus-like taste with no off-flavors when compared to the control cakes. This flavor improvement was not expected beforehand. Both types of cake were of equal height, texture and crumb structure.

The cakes using sodium bisulfate as the acidulant were prepared using both finely ground leavening components (sodium bisulfate and sodium bicarbonate) and leavening components having a larger particle size. The particles of the finely ground leavening components had an average diameter of 0.1 millimeter, while the larger particle size leavening components had an average diameter of 0.74 millimeter. The cakes prepared with finely ground leavening components produced good results in terms of surface appearance. The larger particle size leavening components produced black specks (sodium bisulfate) and brown surface flock (sodium bicarbonate). It was concluded that the cakes should be prepared using finely ground leavening components.

The principle and mode of operation of this invention have been explained in its preferred embodiments. However, it must be understood that this invention may be practiced otherwise than as specifically explained without departing from its spirit or scope.

What is claimed is:

1. A leavened baked good including alkali metal bisulfate and a baking carbonate capable of releasing gas upon reaction with the alkali metal bisulfate to leaven the baked good.

2. The leavened baked good defined in claim 1 wherein the alkali metal bisulfate comprises particles having an average diameter within a range of from about 0.03 millimeter to about 1 millimeter.

3. The leavened baked good defined in claim 2 wherein the alkali metal bisulfate comprises particles having an average diameter within a range of from about 0.03 millimeter to about 0.2 millimeter.

4. The leavened baked good defined in claim 1 wherein the alkali metal bisulfate is included in an amount within a range of from about 0.1% to about 1.0% by weight of the baked good.

5. The leavened baked good defined in claim 1 wherein the baked good is a cake, and wherein the alkali metal bisulfate comprises particles having an average diameter within a range of from about 0.03 millimeter to about 0.2 millimeter.

6. The leavened baked good defined in claim 1 wherein the alkali metal bisulfate contains less than 0.003% heavy metals by weight.

7. The leavened baked good defined in claim 1 wherein the alkali metal bisulfate contains less than 0.05% water insoluble substances by weight.

8. The leavened baked good defined in claim 1 wherein the alkali metal bisulfate contains less than 0.003% selenium by weight.

9. A leavened baked good including sodium bisulfate and a baking carbonate capable of releasing gas upon reaction with the sodium bisulfate to leaven the baked good.

10. The leavened baked good defined in claim 9 wherein the sodium bisulfate comprises particles having an average diameter within a range of from about 0.03 millimeter to about 1 millimeter.

11. The leavened baked good defined in claim 10 wherein the sodium bisulfate comprises particles having an average diameter within a range of from about 0.03 millimeter to about 0.2 millimeter.

12. The leavened baked good defined in claim 9 wherein the sodium bisulfate is included in an amount within a range of from about 0.1% to about 1.0% by weight of the baked good.

13. The leavened baked good defined in claim 9 wherein the baked good is a cake, and wherein the sodium bisulfate comprises particles having an average diameter within a range of from about 0.03 millimeter to about 0.2 millimeter.

14. The leavened baked good defined in claim 9 wherein the sodium bisulfate contains less than 0.003% heavy metals by weight.

15. The leavened baked good defined in claim 9 wherein the sodium bisulfate contains less than 0.05% water insoluble substances by weight.

16. The leavened baked good defined in claim 9 wherein the sodium bisulfate contains less than 0.003% selenium by weight.

17. A leavened baked good including alkali metal bisulfate and a baking carbonate capable of releasing gas upon reaction with the alkali metal bisulfate to leaven the baked good, the alkali metal bisulfate containing, by weight, less than 0.003% heavy metals, less than 0.05% water insoluble substances, and less than 0.003% selenium.

18. The leavened baked good defined in claim 17 wherein the alkali metal bisulfate comprises particles having an average diameter within a range of from about 0.03 millimeter to about 1 millimeter.

19. The leavened baked good defined in claim 17 wherein the alkali metal bisulfate is included in an amount within a range of from about 0.1% to about 1.0% by weight of the baked good.

20. The leavened baked good defined in claim 17 wherein the baked good is a cake, and wherein the alkali metal bisulfate comprises particles having an average diameter within a range of from about 0.03 millimeter to about 0.2 millimeter.

* * * * *